Mar. 6, 1923.
E. P. EDWARDS
UNIVERSAL JOINT
Filed Apr. 22, 1920
1,447,934
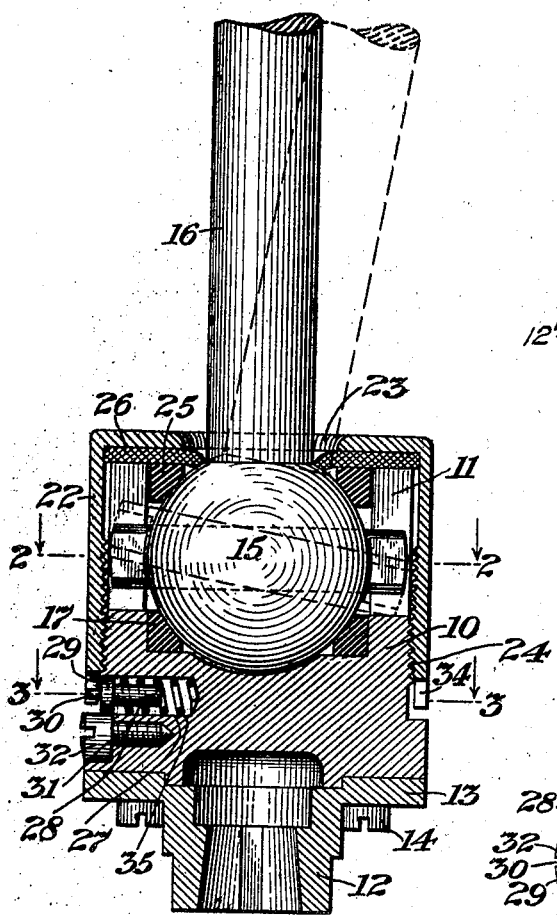
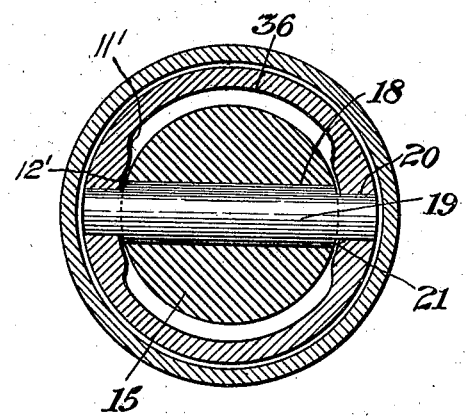
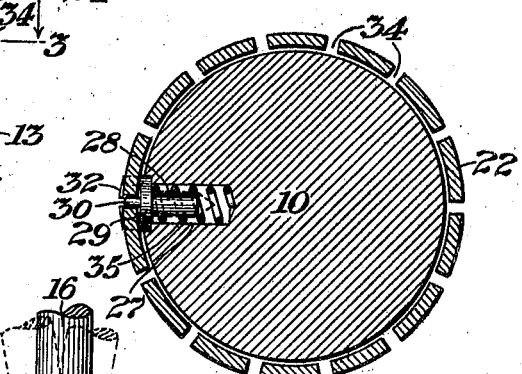
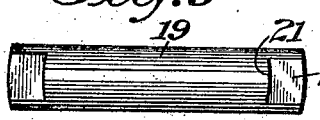
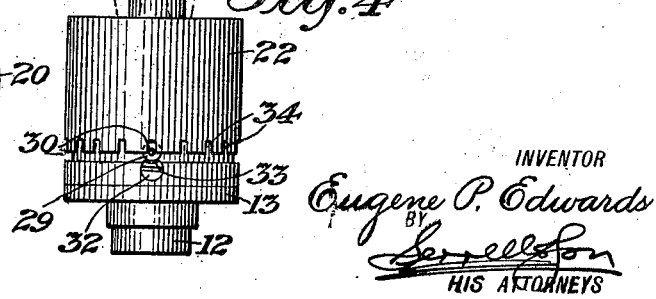
INVENTOR
Eugene P. Edwards
BY
HIS ATTORNEYS Patented Mar. 6, 1923.

1,447,934

UNITED STATES PATENT OFFICE.

EUGENE P. EDWARDS, OF PLAINFIELD, NEW JERSEY, ASSIGNOR TO GEORGE W. NEFF, OF PLAINFIELD, NEW JERSEY.

UNIVERSAL JOINT.

Application filed April 22, 1920. Serial No. 375,662.

*To all whom it may concern:*

Be it known that I, EUGENE P. EDWARDS, a citizen of the United States, residing at Plainfield, in the county of Union and State of New Jersey, have invented an Improvement in Universal Joints, of which the following is a specification.

This invention relates to an improvement in universal joints and more particularly to that type of universal joint shown and described in my copending application, Serial No. 318,883, filed August 21, 1919. In the form of universal joint shown in the application aforesaid, there is employed a cylindrical socket member adapted to receive a ball member to which there is connected a shaft and a drive pin revolubly mounted in the ball member and extending beyond the same and into slots in the walls of the cylindrical member, together with a casing adapted to fit over the ball member and to be secured to the socket member, as well as means for permitting the pin or drive member to turn freely in the ball member and at the same time to prevent its movement longitudinally in the ball member. The object of my present invention is to simplify this construction to primarily reduce the costs of manufacture, as well as to eliminate the means for preventing the pin or drive member from moving longitudinally in the ball member and so constructing the pin member as to make the same bear against the inner face of the cylindrical socket member to accomplish the same purposes, that is to prevent the longitudinal movement of the pin or drive member in the ball member. In carrying out the invention in the present case, therefore, the pin member is not only provided with flat faces at its extremities to operate in the slots in the walls of the cylindrical socket member, but the inner extremities of these flattened faces are also rounded, preferably, to conform to the rounded surface of the ball member in order that, as heretofore stated, these rounded portions of the pin member may bear against the inner face of the walls of the cylindrical socket member to prevent the longitudinal movement of the pin or drive member in the ball member. This, obviously, maintains the pin or drive member in position in the ball member. My present invention also includes a means for locking the casing in position on the socket member, which means are so constructed that the parts thereof interlock when the locking member is in engagement with the casing and may be unlocked by moving the locking member, when, as will be understood from the description of these parts as hereinafter presented, the member associated with the locking member may be turned to hold the locking member out of engagement with the casing.

In the drawing:

Fig. 1 is a central longitudinal cross section and partial elevation of a universal joint made in accordance with my present invention.

Fig. 2 is a cross section on line 2—2, Fig. 1.

Fig. 3 is a cross section on line 3—3, Fig. 1.

Fig. 4 is a side elevation of my improved universal joint on a reduced scale illustrating in plan the devices employed for locking the casing in position, and Fig. 5 is a side elevation of the pin or drive member.

Referring to the drawing, it will be seen that in carrying out this invention, I employ a cylindrical socket member 10 in the walls of which and in oppositely disposed positions there are slots 11, the faces defining the slots acting as bearing surfaces for the drive member, as hereinafter described. The slots 11 are formed in interiorly reinforced or ribbed portions of the cylindrical member as indicated at 11'. The faces of the ribbed portions 11' are recessed longitudinally as indicated at 12', with the recessed surfaces being circular in cross section to receive the ball member of the joint, as hereinafter described. Associated with the socket member, I may also employ a coupling 12 having a flange 13 which is connected to the base of the socket by screws 14 or otherwise.

The universal joint made in accordance with this invention also includes a ball member 15 adapted to be received in the socket member and having extending therefrom a shaft 16. The diameter of the ball member is substantially the same as the diametric distance between the recessed surfaces 12' of the ribbed portions 11' of the socket member. When in position in the socket member the ball member 15 is adapted to rest upon a fibre bearing 17 or a similar bearing made of any other suitable material. Centrally the ball member 15 has a bore 18 in which there is fitted a pin or drive member 19.

This drive member 19, at its ends, is provided with oppositely disposed flattened surfaces 20 which are received in the slots 11 in the ribbed walls of the cylindrical socket member so that, as hereinbefore stated, the faces defining these slots act as bearings for the flattened ends of the drive member 19. The drive member 19 is revoluble in the ball member 15 and to maintain the same in position therein, when the parts of the joint are assembled, the inner extremities of the flattened faces 20 of the drive member forming shoulders thereon are rounded as indicated at 21 preferably to conform to the spherical surface of the ball member 15 so that these rounded surfaces of the drive member may bear against the surfaces of the ribs in the walls of the cylindrical socket member adjacent the slots 11 therein in the operation of the joint.

The improved universal joint also includes a casing or cap member 22 having an opening 23 in the base thereof through which the shaft 16 passes and being interiorly screw threaded adjacent its open end as indicated at 24 so as to be turned down on the screw threaded portion of the cylindrical socket member. In the casing 22, I also prefer to employ a bearing 25 of fibre or other suitable material adapted to lie in contact with the surface of the ball member 15, as well as a washer 26 made of felt or other similar material also adapted to contact with the ball member and its shaft or with either of these members to assist in preventing dust and dirt from entering the joint.

The present invention also includes a means for locking the casing in position on the cylindrical socket member. To this end in a suitable position in the cylindrical socket member there is a radially placed well 27 adapted to receive a locking pin 28. The locking pin 28 is flanged as indicated at 29 and the diameter of the flange 29 is substantially that of the well 27, and exteriorly of the flange 29 the locking pin is provided with a projection 30. Associated with this locking pin there is a screw 31 adapted to be turned down into a tapped opening provided therefor in the cylindrical socket member, and the head 32 of this screw 31 is provided with a rounded recess 33 to receive the flange 29. In the periphery of the casing 22, there are suitable spaced notches 34, each of which is adapted to receive the projection 30 of the locking pin in order to maintain the casing in position on the cylindrical socket member, and the pin is preferably forced outwardly to assume a position in which the flange 29 either bears against the inner surface of the screw head 32 or the inner surface of the casing adjacent the periphery thereof when the casing is in a position for the projection 30 to enter one of the slots 34 or to cause the ends of the projection to bear against the inner surface of the casing by means of a spring 35 which, as indicated, is helical and extends between the inner face of the flange 29 and the base of the well 27. This locking device is shown in its operative position in Figs. 1 and 3 of the drawing in which the casing is locked to the cylindrical socket member and the screw 31 is locked in position, that is, is prevented from turning by the flange 29 being located in the rounded recess 33 in the head of the screw. In order to unlock the parts and adjust the casing as may be necessary, the pin 28 is depressed against the action of the spring 35 and moved sufficiently far to permit the turning of the screw 31 which may then be turned a partial revolution so as to permit the flange 29 upon the recess of the pin 28 and the action of the spring 35 to come into contact with the inner face of the head 32 of the screw, in which position the projection 30 will be entirely clear of the casing 22, thereby freeing the casing and making the same easily adjustable or removable from the cylindrical socket member. As will be clearly seen in Fig. 2, the walls of the cylindrical socket member may be recessed as indicated at 36 in those portions thereof intermediate of diametrically opposite portions in which the slots are employed so that there may be not only a saving of some material but also an appreciable reduction in the weight of the universal joint.

I claim as my invention:

1. In a universal joint, a cylindrical socket member having oppositely disposed internal ribs extending longitudinally thereof and in which there are provided slots with the faces of the ribs being circularly recessed, a ball member of substantially the same diameter as the diametric distance between the circularly recessed faces of the said ribs, a shaft extending from the said ball member, and a pin mounted to turn in the said ball member and having flattened ends extending beyond the ball member and into the said slots in the ribbed portions of the socket member, with the surfaces of the shoulders formed between the pin and the flattened ends thereof being rounded to conform to the spherical surface of the ball member so as to bear against the circularly recessed portions of the said ribs to prevent longitudinal movement of the pin.

2. In a universal joint, a socket member having slots in the walls thereof, a ball member, a pin mounted to turn in the ball member and having flattened ends extending beyond the ball member and into the slots in the socket member, with the surfaces of the shoulders formed between the pin and the flattened ends thereof being rounded to conform to the surface of the ball member and thus to bear against the inner surfaces of the socket member to prevent longitudinal movement of the pin in the ball member, and a casing fitting over the ball member and socket member and adapted to be connected to the latter.

3. In a universal joint, a cylindrical socket member having slots in oppositely disposed positions in the walls thereof, a ball member, a shaft extending therefrom, a pin mounted to turn in the ball member and having flattened ends extending beyond the ball member and into the slots in the socket member, with the surfaces of the shoulders formed between the pin and the flattened ends thereof being rounded to conform to the spherical surface of the ball member and thus to bear against the inner surfaces of the socket member to prevent the pin from moving longitudinally in the socket member, and a casing fitting over the ball member and socket member and adapted to be connected to the latter.

4. In a universal joint, a cylindrical socket member having oppositely disposed internal ribs extending longitudinally thereof and in which there are provided slots with the faces of the ribs being circularly recessed, a ball member of substantially the same diameter as the diametric distance between the circularly recessed faces of the said ribs, a shaft extending from the said ball member, a pin mounted to turn in the said ball member and having flattened ends extending beyond the ball member and into the said slots in the ribbed portions of the socket member, with the surfaces of the shoulders formed between the pin and the flattened ends thereof being rounded to conform to the spherical surface of the ball member so as to bear against the circularly recessed portions of the said ribs to prevent longitudinal movement of the pin, and a casing fitting over the ball member and socket member and adapted to be connected to the latter.

5. In a universal joint, a cylindrical socket member, a ball member within the cylindrical socket member, a pin passing through the ball member and having its ends extend beyond the same and into slots provided therefor in the walls of the socket member, a casing fitting over the ball member and adapted to be connected to the socket member, there being a series of slots in the edge of the casing, a locking pin in a radially disposed well provided therefor in the socket member, the said pin being adapted to engage in any one of the slots in the edge of the casing, and means interlocking with the said pin when in its operative position and adapted to maintain the said pin in an inoperative position.

6. In a universal joint, a cylindrical socket member, a ball member within the cylindrical socket member, a pin passing through the ball member and having its ends extend beyond the same and into slots provided therefor in the walls of the socket member, a casing fitting over the ball member and adapted to be connected to the socket member, there being a series of slots in the edge of the casing, a pin in a radially placed well in the said socket member, means for normally forcing the said pin outwardly and into position in engagement in one of the slots in the edge of the casing, and means interlocking with the said pin when the pin is in its operative position and for maintaining the said pin in a depressed and inoperative position.

7. In a universal joint, a cylindrical socket member, a ball member within the cylindrical socket member, a pin passing through the ball member and having its ends extend beyond the same and into slots provided therefor in the walls of the socket member, a casing fitting over the ball member and adapted to be connected to the socket member, there being a series of slots in the edge of the casing, a pin located in a radially disposed well provided therefor in the said socket member, a spring for normally forcing the pin outwardly and into engagement with the inner surface of the casing so that the outer extremity of the pin will snap into place in one of the slots in the casing when the casing is turned to bring a slot into line with the said pin, and a screw associated with the said pin and having a recessed portion in the periphery of its head adapted to receive a part of the said pin when the pin is in engagement with a slot in the casing and to engage another portion of the said pin when depressed to maintain the pin in a depressed position so as to free the outer end of the same from the said casing.

Signed by me this 12th day of April, 1920.

EUGENE P. EDWARDS.